(12) United States Patent
Klaus

(10) Patent No.: US 6,200,127 B1
(45) Date of Patent: Mar. 13, 2001

(54) BI-DIRECTIONAL CHECK RING FOR A TWO-STAGE INJECTION UNIT

(75) Inventor: M. Barr Klaus, Cincinnati, OH (US)

(73) Assignee: Milacron Inc., Cincinnati, OH (US)

( * ) Notice: Subject to any disclaimer, the term of this patent is extended or adjusted under 35 U.S.C. 154(b) by 0 days.

(21) Appl. No.: 09/258,729

(22) Filed: Feb. 26, 1999

(51) Int. Cl.⁷ .................................................. B29C 45/54
(52) U.S. Cl. .......................... 425/557; 425/559; 425/561
(58) Field of Search .................................. 425/557, 558, 425/559, 560, 561

(56) References Cited

U.S. PATENT DOCUMENTS

| | | | |
|---|---|---|---|
| 4,189,161 | 2/1980 | Grimm | 277/221 |
| 4,477,242 | 10/1984 | Eichlseder et al. | 425/207 |
| 4,850,851 | 7/1989 | Dinerman | 425/562 |
| 5,071,142 | 12/1991 | Rehfeld | 277/142 |
| 5,090,711 | 2/1992 | Becker | 277/68 |
| 5,112,213 | 5/1992 | Oas | 425/562 |
| 5,167,971 | 12/1992 | Gill et al. | 425/559 |
| 5,286,187 | * 2/1994 | Niimi et al. | 425/557 |
| 5,401,161 | 3/1995 | Long | 425/563 |
| 5,518,394 | 5/1996 | Shiozawa et al. | 425/562 |
| 5,925,295 | * 7/1999 | Nakamura et al. | 425/557 |
| 6,017,210 | * 1/2000 | Takayama et al. | 425/557 |

* cited by examiner

*Primary Examiner*—Tim Heitbrink
(74) *Attorney, Agent, or Firm*—Stephen H. Friskney

(57) ABSTRACT

The invention is directed to a bi-directional check ring for a two-stage injection unit. More specifically, a close fitting ring is inserted behind the plunger head of the melt accumulator so that normal running clearances between the plunger and barrel bore can be used. The outer diameter of this check ring has a very close fit with the inner diameter the injection barrel, but is not rigidly connected to the plunger. Accordingly, the plunger is free to "floats" while injection and plastication/filling take place. The open volume between the ring and plunger is small, but sufficient to permit the ring to "float" very close to the barrel inner diameter, without being influenced by the alignment of the plunger and injection drive motor.

4 Claims, 2 Drawing Sheets

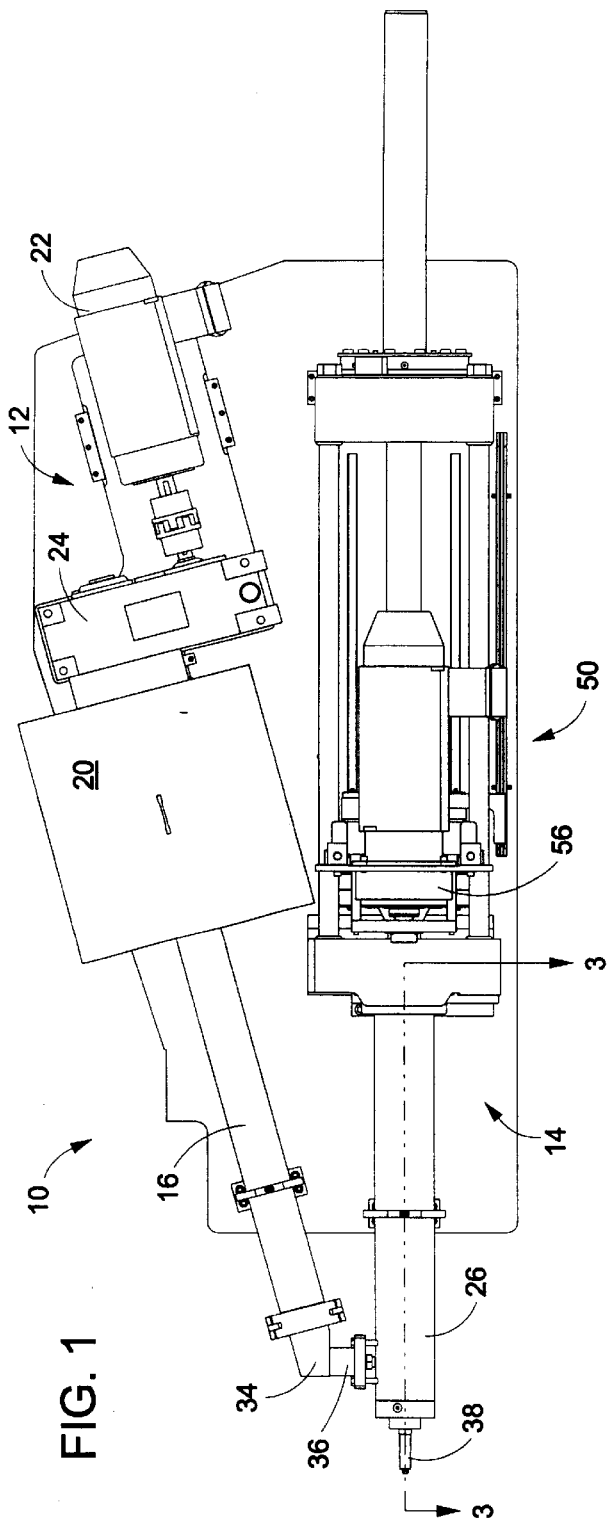
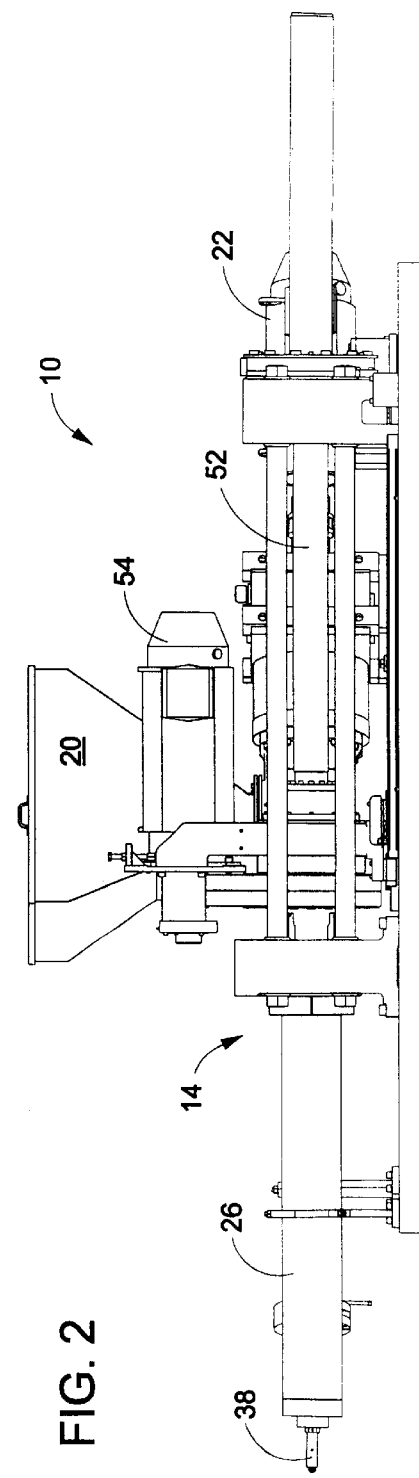
FIG. 1
FIG. 2

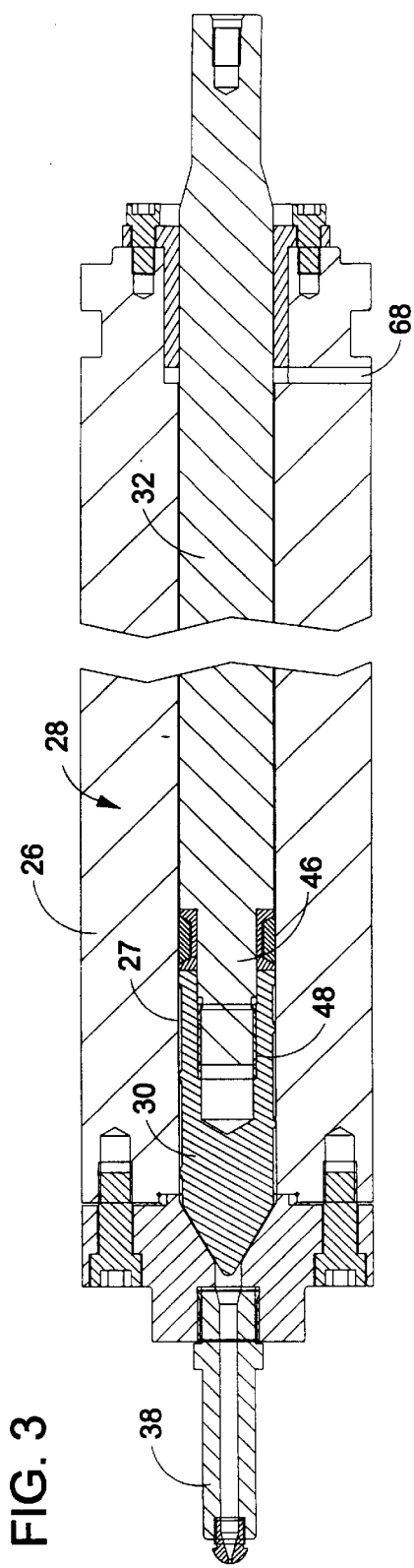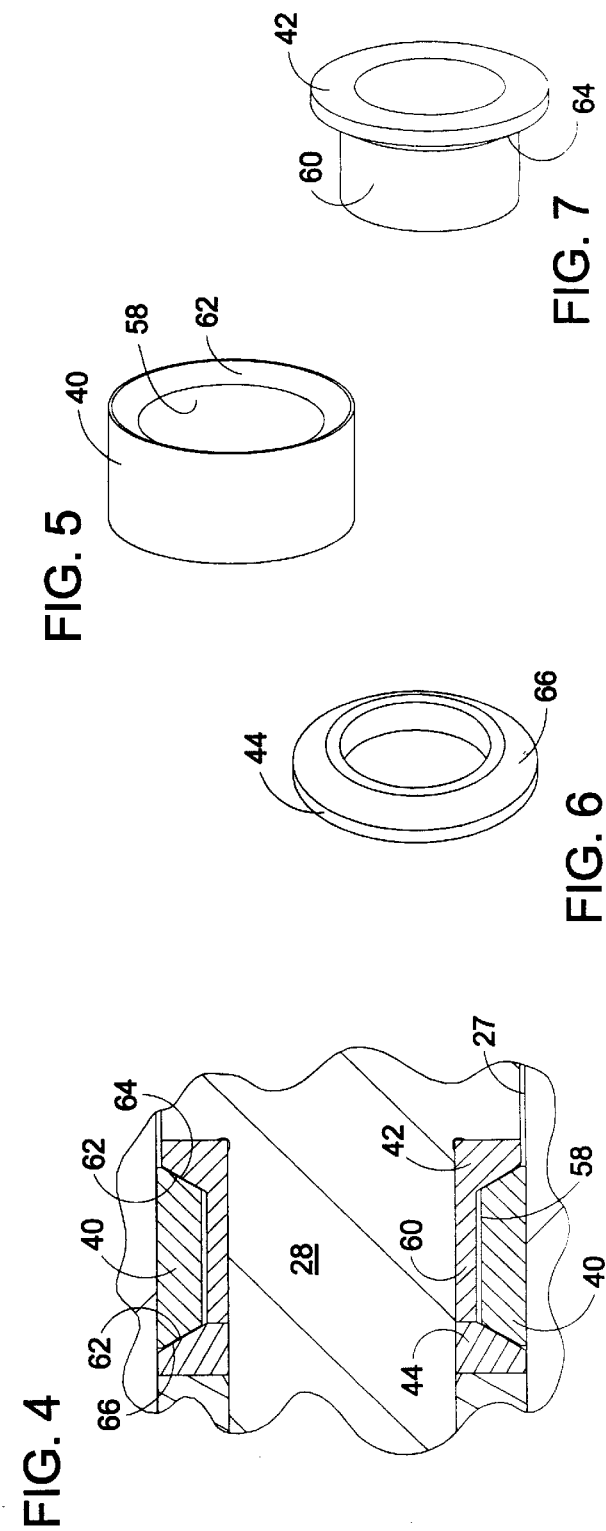

BI-DIRECTIONAL CHECK RING FOR A TWO-STAGE INJECTION UNIT

BACKGROUND OF THE INVENTION

1. Field of the Invention

The present invention relates generally to a two-stage injection unit for an injection molding machine and, more particularly, to a check ring assembly used in conjunction with the plunger of the melt accumulator in a two-stage injection unit.

2. Description of the Related Art

The injection unit of an injection molding machine provides essentially two functions during the course of a normal cycle of operation; namely, injection and extruder. In a standard reciprocating screw injection molding machine, the extruder function is accomplished when the screw is rotated, gradually moving plastic melt toward the forward end of the screw, thereby creating a pressure or force to move the screw rearward to its pre-injection position as the melt accumulates. When a sufficient amount of material is accumulated ("a shot"), the screw is moved rapidly forward (without rotation) to inject the melt straight into the mold, thus performing the injection function.

The injection unit of a molding machine can also be designed as a "two-stage" system where the extruder and injection functions are performed by separate machine elements. In a two-stage injection system, the extruder or plasticizing function is still performed by a feed screw in a heated barrel, but all or part of the plastic melt is diverted into an "accumulator" rather than being conveyed directly to the mold. The accumulator is subsequently operated to perform or, at least, assist in performing the injection function. The accumulator is essentially a variable volume reservoir comprising a tubular barrel and a reciprocating plunger. The relative size of the barrel and plunger, as well as the stroke of the plunger, will vary according to the quantity of melt required to fill the mold. The advantages of a two-stage injection unit include more uniform plastication of material, reduced wear on the screw and barrel, and the potential for higher injection pressures.

In the prior art, two stage injection plungers have operated at very small running clearances between the outer diameter of the plunger head and the inner diameter of the bore of the barrel. This type of construction minimized the amount of material that flowed over the plunger during injection. (Plastic melt flowing to the "back" side of the plunger causes a major housekeeping nuisance and becomes a source of costly material scrap.) The close running clearance also improved injection efficiency because a higher percentage of injected material went into the mold instead of over the plunger as injection pressure rose to a higher level, as is required to fill thin wall parts. Since plunger strokes were very short (usually less than three times the plunger diameter) in early prior art units, the alignment between the plunger shaft that transmitted injection force and the plunger head could be maintained without encountering significant problems of galling or pick-up between the barrel and the plunger head.

Recent developments in two-stage injection have recognized the value of significantly increasing the length of stroke of the plunger relative to the diameter of the plunger head. More specifically, since the diameter of the plunger head determines the load carrying requirements for the mechanism that drives the plunger, larger shot capacities and greater shot accuracy can be accomplished with the two-stage design by providing increased length of stroke at relatively small plunger diameters. However, with the longer strokes, the close running clearance between the plunger and barrel used in the prior art is not practical, since it renders the assembly prone to the galling and pick-up problems noted above. If the clearance is increased to avoid these problems, the leakage past the plunger during injection increases significantly, causing the housekeeping and waste problems mentioned previously. The increased clearance also increases the likelihood that material that previously flowed past the plunger will contaminate the new melt that enters the accumulator during the filling process.

SUMMARY OF THE INVENTION

Accordingly, it is an object of the present invention to provide an improved construction for the plunger of the melt accumulator in a two-stage unit that will enable relatively long plunger injection strokes and minimize leakage of melt past the plunger. It is a further object of the invention to provide a plunger construction where alignment between the plunger head, plunger shaft and drive mechanism is less critical that the prior art constructions.

In accordance with these objectives, the invention provides a close fitting ring inserted behind the plunger so that normal running clearances, for example, clearances in the range of those used for feed screws in reciprocating screw injection units having similar geometry, can be used. The outer diameter of this check ring has a very close fit with the inner diameter the injection barrel, but is not rigidly connected to the plunger. Accordingly, it is free to "float" while injection and plastication/filling take place. Since it is a specific objective that no plastic flows through the ring of the invention (unlike the "check rings" used with reciprocating screws), the open volume between the ring and plunger can be extremely small and still permit the ring to "float" very close to the barrel inner diameter, without being influenced by the alignment of the plunger and injection drive mechanism. This is an important advantage since such alignment can be difficult with the long plunger shafts desired for larger shot size and more accurate control.

During injection, the ring restricts material "back-flowing" over the plunger and coming out the back of the accumulator barrel, in a manner similar to the tight running clearance of earlier plunger designs. In addition, the ring provides protection against melt contamination as the plunger retracts during plastication/filling by preventing small amounts of material which may have passed over the ring (during injection) from re-entering the melt stream by passing back over the plunger and mixing with the accumulated melt for the next shot. In fact, the ring is even more efficient in the retraction direction because there is only minimal pressure to force the material over the ring. The clear benefit is in keeping the freshly plasticized material free from contamination by other materials or colors processed previously which may reside on the plunger shaft behind the ring. Such material may have thermally decomposed over time and would be particularly objectionable if passed through to the mold cavity. The invention makes it possible to process certain engineering materials that were previously not compatible with two stage injection units.

BRIEF DESCRIPTION OF THE DRAWINGS

FIG. 1 is a top view of a two stage injection unit incorporating a plunger assembly according to the present invention.

FIG. 2 is a side view of the two stage injection unit as shown in FIG. 1.

FIG. 3 is a sectional view of the melt accumulator of the two-stage electric injection unit, taken along the line 3—3 of FIG. 1.

FIG. 4 is an enlarged view of a portion of the plunger assembly illustrated in FIG. 3, focusing on the elements of the present invention that restrict the flow of plastic material past the plunger head.

FIG. 5 is an isometric view of the check ring as taught by the present invention.

FIG. 6 is an isometric view of the plunger seat as taught by the present invention.

FIG. 7 is an isometric view of the plunger spacer as taught by the present invention.

DESCRIPTION OF THE PREFERRED EMBODIMENT

The present invention is particularly well suited for use in a two-stage electric injection unit 10 of an injection molding machine (not shown). Since the general structure and operation of injection molding machines are well known, only those aspects of the apparatus that are different or take on a new use with respect to two-stage electric injection will be described.

The apparatus of the present invention is used in conjunction with a two-stage electric injection unit 10 which includes components that are specifically designed to implement electric motor drive technology in a two-stage injection unit. Preferably, the primary elements are an electrically driven extruder 12 and a melt accumulator 14. The extruder 12 is intended only for plasticizing and, therefore, has a non-reciprocating feed screw (not shown) within the barrel 16. If desired, however, the concepts of the present invention can also be applied to a two-stage injection system that incorporates a reciprocating feed screw.

As is generally known in the art, material is supplied to the extruder 12 in any convenient manner, such as by a hopper 20. The rotational power for the feed screw is also provided in a conventional manner, as by an electric motor 22, connected to a speed reduction gearbox 24 that drives the feed screw. Since the movement of the feed screw is rotational only, the drive system is greatly simplified over the injection units having a screw, which must also reciprocate.

The accumulator 14 is essentially a variable volume reservoir by virtue of a cylindrical barrel 26 and a plunger 28 that moves linearly within the barrel 26. The plunger 28 preferably has a flighted head 30 and an elongated shaft 32. The relative size of the bore 27 of the barrel 26 and plunger head 30, as well as the stroke of the plunger 28, will vary according to the quantity of melt required to fill the mold. In the constriction of melt accumulator 14, it is desirable to configure the end-shape of the barrel 26 and plunger 28 in a way that minimizes the amount of resin remaining in the barrel 26 when the plunger 28 is fully extended, as will be more fully discussed later.

The outlet of the extruder 12 connects to accumulator 14 via a suitable conduit 34. At a convenient point between the extruder 12 and the inlet to the accumulator 14, a ball check valve or other suitable non-return device 36 is provided to control the direction of the flow through conduit 34. When the accumulator 14 is activated to inject plastic into a mold cavity and maintain pressure during pack and hold, the check valve 36 prevents a back-flow of melt into the extruder 12 due to the pressure differential during the injection phase. The outlet of the accumulator 14 is connected to the injection mold (not shown) via a suitable nozzle 38.

By optimizing the length of stroke and diameter of the plunger head 30, important advantages of an all-electric machine design can be realized. The diameter of the plunger head 30 dictates the load carrying requirements for the screw mechanism that converts the rotary motion of the motor 54 into linear motion for the plunger 28. However, the larger shot capacities can be easily accomplished with the two-stage design by providing increased length of stroke at relatively small plunger diameters. The disadvantage is that the longer the plunger shaft 32, the more difficult it is to align the plunger 28 with the drive mechanism. Accordingly, alignment problems are overcome by increasing the clearances between the plunger head 30 and plunger shaft 32 with the bore 27 of the accumulator barrel 26.

Preferably, the plunger head 30 is designed to have a "normal" running clearance with the bore 27 of the barrel 26; that is, clearances in the range used for feed screws in reciprocating screw injection units having similar geometry, about 0.006 in. for a 3.000 in. diameter screw. This ensures good injection control with minimal metal-to-metal contact between the head 30 and bore 27. In fact, the clearance between the outer diameter of the plunger head 30 and the bore 27 allows space for plastic melt to flow between these two metal surfaces, so that the melt effectively serves as a lubricant. The plunger shaft 32 is preferably slightly smaller in diameter than the head 30 to provide additional clearance, but is as large as practical to carry the force for injection.

To restrict back-flow over the plunger head 30 due to the clearance with the bore 27, a check ring 40 is provided between the plunger head 30 and plunger shaft 32. To simplify machining and assembly of the elements comprising the plunger 28, a spacer 42 and seat 44 provide the bearing surfaces for the check ring 40. In particular, the plunger 28 is assembled by placing the spacer 42 on a reduced diameter, threaded extension 46 of the plunger shaft 32. The check ring 40 is then placed over the spacer 42 and the seat 44 is placed on the extension 46 against the spacer 42. The plunger head 30 has a threaded bore 48 to engage the threads on the extension 46, and is tightened so that the spacer 42 and seat 44 are held tightly between the plunger head 30 and plunger shaft 32, as shown in FIGS. 3 and 4 of the drawings.

The check ring 40 is designed to have minimal clearance with the bore 27: for example, about 0.001 in. for a bore diameter of 3.000 in. More generous clearance, e.g. about 0.010 in., is allowed between the end surfaces 62 of the check ring 40 and the bearing surface 64 of spacer 42 on one end and the bearing surface 66 of seat 44 at the other end. Substantially greater clearance, e.g. about 0.030 in., is allowed between the inner diameter 58 of the check ring 40 and the extended shoulder 60 of the spacer 42. This construction essentially allows the check ring 40 to "float" relative to the rest of the plunger 28. This is an important advantage since it makes alignment between the long plunger shaft 32 and the elements of the drive system less critical.

The plunger 28 of accumulator 14 is preferably actuated by an electromechanical drive assembly 50, see FIGS. 1 and 2. The drive assembly 60 preferably includes a screw mechanism 52, such as a roller screw or ball screw, a variable speed electric motor 54 and coupling, such as a drive belt 56, between the screw mechanism 52 and motor 54. The driven end of the screw mechanism 52 connects to the motor 54; the opposite end of the screw mechanism 52 connects to the plunger shaft 32 by means of a suitable coupling (not specifically shown). Preferably, the coupling includes a one-way clutch that allows the screw mechanism 52 to rotate freely with respect to the plunger 28 during injection to transmit efficiently linear (horizontal) force from the screw mechanism 52 to the plunger 28 without adversely affecting the melt contained in the accumulator 14. However, reverse rotation of the screw mechanism 52 (during refill of the accumulator) engages the one-way clutch, causing the plunger 28 to rotate within the barrel 26.

Although it is desirable for the check ring 40 to slide relatively easily in the bore 27 during translational movement of the plunger 28, it is preferable that the ring 40 not rotate with the plunger 28. This can be accomplished by designing the elements to control frictional forces. For example, the end surfaces 62 of the check ring 40 are made so that they not parallel to the opposing bearing surfaces 64, 66 of the spacer 42 and seat 44, respectively. More specifically, they are at a slight angle (about 1°) relative to each other to create a circular "line" of contact for an efficient seal with minimal friction. In contrast, the outer diameter of the check ring 40 has only a small clearance with the bore 27, and has a relatively large peripheral surface area. Accordingly, there is greater friction on the outer diameter of the check ring 40 than there is on the end surfaces 62, so the ring 40 does not rotate with the plunger 28.

A cycle of operation of an injection molding machine, incorporating the two-stage injection unit 14 of the present invention will now be described. The feed screw is rotated within the barrel 16 by the extruder motor 22 to begin plastication of the material that will be supplied as plastic melt to the accumulator 14. The rotation of the feed screw builds pressure at the end of the screw, opening the check valve 36 and causing material to flow through the conduit 34 and into the accumulator 14.

The inlet to the accumulator 14 is positioned so that melt flowing into the barrel 26 will pass over the flighted plunger head 30. The incoming melt will flow along the flights, cleaning out melt carried over from the previous shot and moving it toward the outlet end of the barrel 26, causing the pressure in the accumulator 14 to build. When the pressure of the plastic melt reaches a certain level, it will begin to force the plunger 28 rearwardly, thereby moving the screw of the mechanism 52 and motor 54 toward the rear of injection unit 10. The rearward movement of plunger 28 applies a force to the screw mechanism 52 through the coupling, causing the screw to move likewise to the rear; as the screw moves through the associated nut, it rotates in a reverse direction. This reverse rotation of the screw is imparted to the plunger 28 via engagement of the one-way clutch, as described above. The rotation of plunger 28 further aids in cleaning carry-over material from the flighted head 30 by enhancing the wiping action of the inflow of new melt.

Although the check ring 40 does not rotate with the plunger 28 as it retracts, the ring 40 does create an effective seal at its outer periphery and from the contact between the end surface 62 and the bearing surface 66 of the seat 44. This prevents any plastic residue remaining in the barrel 26 (behind the plunger head 30) from mixing into the flow of melt from the extruder 12. In fact, the ring 40 will act to push any residue back to the rear of the barrel 26 where a drain passageway 68 is provided to permit accumulated residue material to flow from the barrel 26.

If desired, the rate of rearward movement of the plunger 28 can be controlled by the motor 54. In particular, the motor 54 can be used as a brake to impede the rotation of screw mechanism 52, which slows the rearward movement of the plunger 28, thereby increasing the back pressure of the plastic melt. Alternatively, the motor 54 can be used to speed up the rotation and rearward movement of the screw mechanism 52, which increases the rate at which the plunger 28 moves back, thereby decreasing the back pressure of the melt. In either case, the rotational speed of the screw is imparted to the plunger 28 by the one-way clutch.

The extrusion function is complete and rotation of the feed screw is stopped when a sufficient charge of plastic melt is accumulated in front of the plunger 28 in the accumulator 14, as required to fill the cavity of the mold. Concurrently with the extrusion function, the injection molding machine clamp unit has been operated to close and build pressure on the mold that will receive the plastic melt.

To initiate the injection function, the motor 54 is activated to cause the screw mechanism 52 to rotate and advance. The translational (linear) movement of the screw is imparted to the plunger 28 housed in the accumulator 14. However, the rotation of the screw mechanism 52 is not imparted to the plunger 28 since the one-way clutch is disengaged when the screw rotates in the forward direction. The check ring 40 shifts slightly so that its end surface 62 comes into contact with the bearing surface 64 of the spacer 42. The contact between these surfaces and the small clearance between the outer diameter of the ring 40 and the bore 27 creates an effective seal that substantially prevents melt from leaking past the plunger head 30 and remaining in the barrel 26 during injection.

The forward movement of the plunger 28 causes the accumulated plastic melt to be forced through the nozzle 38 and into the mold cavity. The injection pressure generated by movement of the plunger 28 moves the check valve 36 to a position that prevents transfer of the melted resin into the extruder 12. After the bulk of material is transferred into the mold cavity, the injection accumulator 14 initiates pack, then "hold", to maintain the proper pressure on the material until the molded part is properly formed. When the injection accumulator 14 reaches the "hold" portion of the cycle, it has emptied itself of material. In other words, the injection of plastic melt is accomplished by applying sufficient force to move the plunger 28 rapidly forward in the barrel 26, forcing the melt to flow through the outlet of the injection accumulator 14, on through the nozzle 38, then into the mold. This approximate point in the cycle can be identified by the configuration shown in FIG. 3; the plunger head 30 in the accumulator 14 is fully forward in the barrel 26, having completed the injection function.

As part of the injection process, it is highly desirable to avoid "dead" spots in the material flow path where plastic melt can remain stationary through repeated cycles, allowing it to degrade, possibly later mixing with good material and injected to form a poor quality part. Accordingly, a mating configuration between the head 30 of the plunger 28 and the outlet of the barrel 26 will minimize the amount of material remaining in the accumulator 14 after the shot is completed. The only significant carry-over material is in the flight of the plunger head 30 which is "wiped" clean by the inflow of new melt and rotation of the plunger 28 as the subsequent shot accumulates (and is injected into the mold during the next cycle of operation).

After sufficient hold/cool time, the pressure held by the injection accumulator 14 is released during mold decompress, which may include a slight retraction of the plunger 28. The clamp unit can then operate to open the mold, eject the part(s), then re-close to begin a subsequent cycle, as required for a particular application. After the injection hold time is completed, at some point during the cooling time, the extruder 12 starts rotation of the feed screw to initiate the extrusion function as described previously and begin another cycle of operation.

While the invention has been illustrated in some detail according to the preferred embodiment shown in the accompanying drawings, and while the preferred embodiment has been described in some detail, there is no intention to thus limit the invention to such detail. On contrary, it is intended to cover all modifications, alterations, and equivalents falling within the scope of the appended claims. For example, although the drive couplings are generally described as belts and pulleys, other mechanical couplings, such as suitable gearing, can be used to perform the same function. In addition, other systems or mechanisms can be used to impart linear motion to the accumulator plunger 28; such as, a rack and pinion, a roller screw and nut in place, or a ball screw and ball nut as described. Alternatively, a suitably configured linear (electric) motor can be used to actuate the plunger 28 directly.

What is claimed is:

1. A two-stage injection unit including an extruder for generating a flow of plastic melt, and a melt accumulator for receiving the melt from the extruder and subsequently injecting the melt into a mold cavity, wherein the melt accumulator comprises:

a generally cylindrical barrel having longitudinal bore;

a plunger received within the bore of the barrel, the plunger having a head attached to an elongated shaft, the plunger being movable relative to the barrel so that it retracts when melt is transferred into the accumulator and advances to inject melt into the mold cavity; and a bi-directional check ring fitted between bearing surfaces associated with the plunger head and plunger shaft, the ring having an outer diameter sized to match closely the diameter of the barrel bore, such that the check ring substantially prevents (i) the melt from leaking past the head of the plunger and remaining in the barrel after injection and (ii) plastic residue behind the plunger head from mixing into the flow of melt from the extruder.

2. The two-stage injection unit claimed in claim 1, wherein the bi-directional check ring has an annular bearing surface on each end, such that one bearing surface contacts the bearing surface associated with the plunger shaft during injection, and the other bearing surface of the check ring contacts the bearing surface associated with the plunger head during melt transfer from the extruder.

3. The two-stage injection unit claimed in claim 2, wherein the bearing surfaces associated with the plunger head and shaft are angled with respect to the mating bearing surfaces on the ends of the check ring.

4. The two-stage injection unit claimed in claim 2 or 3, wherein one of the bearing surfaces associated with the plunger head and shaft includes a cylindrical portion that is received within the inner diameter of the check ring.

* * * * *